United States Patent
Gicza et al.

[19]

[11] Patent Number: 6,032,828

[45] Date of Patent: Mar. 7, 2000

[54] CATALYST EXCHANGE DEVICE

[75] Inventors: Shlomo Gicza, Willowdale, Canada; Bruno Pross, Pazzallo, Switzerland

[73] Assignee: Arbo Engineering Inc., North York, Canada

[21] Appl. No.: 08/954,360

[22] Filed: Oct. 20, 1997

[51] Int. Cl.[7] ................. B67B 7/00; B67D 5/08
[52] U.S. Cl. ................. 222/1; 222/55; 222/77; 222/199; 222/330
[58] Field of Search .................. 222/1, 56, 77, 222/196.1, 199, 330, 55; 141/409–198; 414/160, 162; 198/540, 547, 546

[56] References Cited

U.S. PATENT DOCUMENTS

| | | | |
|---|---|---|---|
| 2,333,435 | 11/1943 | Muskat ................................ | 198/540 |
| 2,792,030 | 5/1957 | Wahl . | |
| 2,848,144 | 8/1958 | Haskell et al. . | |
| 2,848,177 | 8/1958 | Bandy . | |
| 3,223,490 | 12/1965 | Sacken et al. . | |
| 3,732,993 | 5/1973 | Csapo ........................................ | 214/18 |
| 4,273,266 | 6/1981 | Snape .................................. | 198/540 X |
| 4,402,643 | 9/1983 | Lytton et al. .......................... | 414/160 |
| 4,701,101 | 10/1987 | Sapoff ..................................... | 414/786 |
| 4,762,252 | 8/1988 | Hyer et al. ............................... | 222/56 |

*Primary Examiner*—Gregory L. Huson
*Attorney, Agent, or Firm*—Ladas & Parry

[57] ABSTRACT

A dispenser to dispense a granular material to a plurality of discrete locations, such as a tube of a reactor vessel. The dispenser includes a hopper to contain the granular material and has a discharge port to permit egress of material from the hopper. A conveyor receives material from the discharge port and transfers it to the plurality of discrete locations. The conveyor comprises a tray having a plurality of outlets spaced from the discharge port and each connectable to respective ones of the discrete locations. A barrier is interposed between adjacent ones of the outlets to inhibit transfer of material therebetween. A vibratory drive oscillates the tray and distributes the granular material uniformly on the tray. The drive induces movement of the material from the discharge port to the outlets along the tray.

25 Claims, 4 Drawing Sheets

CATALYST EXCHANGE DEVICE

The present invention relates to dispensers for granular material and to methods of utilizing such dispensers.

BACKGROUND OF THE INVENTION

There are many applications in which it is necessary to dispense granular material under controlled conditions. Typically such dispensing is widely used in the food, plastic, chemical and ceramic industries where granular products as diverse as nuts or aluminum flakes may need to be dispensed with high precision and consistency. A number of dispensers are commercially available but one that offers improved control is that available from Arbo Engineering Inc. of North York, Ontario that utilizes a resonant vibratory system. In such a system, a tray is oscillated to convey the granulated material from a hopper and the frequency of oscillation is maintained at the resonant frequency of the tray and the material that it is conveying. Flow rate of the material along the conveyor may be adjusted by varying the amplitude of oscillation. Such dispensers have achieved a high acceptance rate in the industry and offer a high turn down ratio, that is the range of rates that may be dispensed from the same conveyor.

One application that utilizes granulated material is a reactor vessel commonly used in the chemical industry. Such a vessel would typically have a number of tubes containing a reactant or catalyst that must be replaced periodically. At present such replacement is performed manually which is time consuming, arduous and potentially dangerous work. As well it is necessary to ensure that the material provided in each tube of the reactor vessel is uniform and consistent for satisfactory operation of the vessel. Manual replenishment of the material in the tubes requires each tube to be treated individually to ensure consistency between tubes and adds to the cost of such replenishment.

It is therefore an object of the present invention to provide an apparatus and method that obviates or mitigates the above disadvantages.

BRIEF SUMMARY OF THE INVENTION

In general terms, the present invention provides a dispenser for granular material that dispenses the material in a controlled manner at a plurality of outlets.

In one aspect, the present invention provides a dispenser to dispense a granular material to a plurality of discrete locations. The dispenser includes a hopper to contain the granular material and has a discharge port to permit egress of material from the hopper. A conveyor receives material from the discharge port and transfers it to the plurality of discrete locations. The conveyor comprises a tray having a plurality of outlets spaced from the discharge port and each connectable to respective ones of the discrete locations. A barrier is interposed between adjacent ones of the outlets to inhibit transfer of material therebetween on the tray. A vibratory drive oscillates the tray and distributes the granular material uniformly. The drive induces movement of the material from the discharge port to the outlets along the tray.

Preferably the vibratory drive is a resonant drive having a control to maintain the oscillations at a resonant frequency of the conveyor.

According to a further aspect of the invention, there is provided a method of replenishing a granular material in a chemical reactor having an array of tubes each of which is to contain a predetermined quantity of the material. The method comprises the steps of i) emptying the tubes of any of the material; ii) connecting a plurality of the tubes to respective ones of a plurality of outlets of a dispenser; iii) discharging the granular material from a hopper of the dispenser to a conveyor; iv) distributing the material uniformly on the conveyor; v) moving the material toward the outlets; vi) dividing the material into a plurality of equal streams as it moves towards the outlets; vii) discharging the streams through respective outlets simultaneously to commence filling of the plurality of the tubes, and viii) monitoring the contents of the tubes and terminating discharge of the material from each of the outlets simultaneously upon attainment of a predetermined fill condition. In this way a plurality of tubes are substantially uniformly filled with the granular material simultaneously.

Preferably the conveyor includes a tray driven by a vibratory drive and the amplitude of oscillations of the tray is monitored and maintained at a predetermined level.

According to a third aspect of the invention, there is provided a reactor replenishing unit for replenishing granular material in tubes of a reactor vessel. The unit includes a dispenser to dispense the granular material at a plurality of outlets and a manifold to convey the material from the outlets to respective ones of the tubes. The dispenser has a hopper to contain the granular material, and a conveyer to receive the granular material from the hopper and transfer it to the outlets. The conveyer divides the material between the hopper and the outlets into a plurality of streams. Each stream is associated with respective ones of the outlets whereby each stream is conveyed to a respective one of the tubes by the manifold.

BRIEF DESCRIPTION OF THE DRAWINGS

An embodiment of the invention will now be described by way of example only, with reference to the accompanying drawings, in which.

DESCRIPTION OF THE PREFERRED EMBODIMENTS

A reactor vessel generally indicated 10 encloses an array of reactor tubes 12 consisting of individual tubes 14. Each of the tubes 14 contains a granular material such as a catalyst or reactant used in the chemical process performed in the reactor vessel. Typically such tubes may be between 0.5 and 2" in diameter and there may be over 18,000 of such tubes in each vessel.

Figure 1:
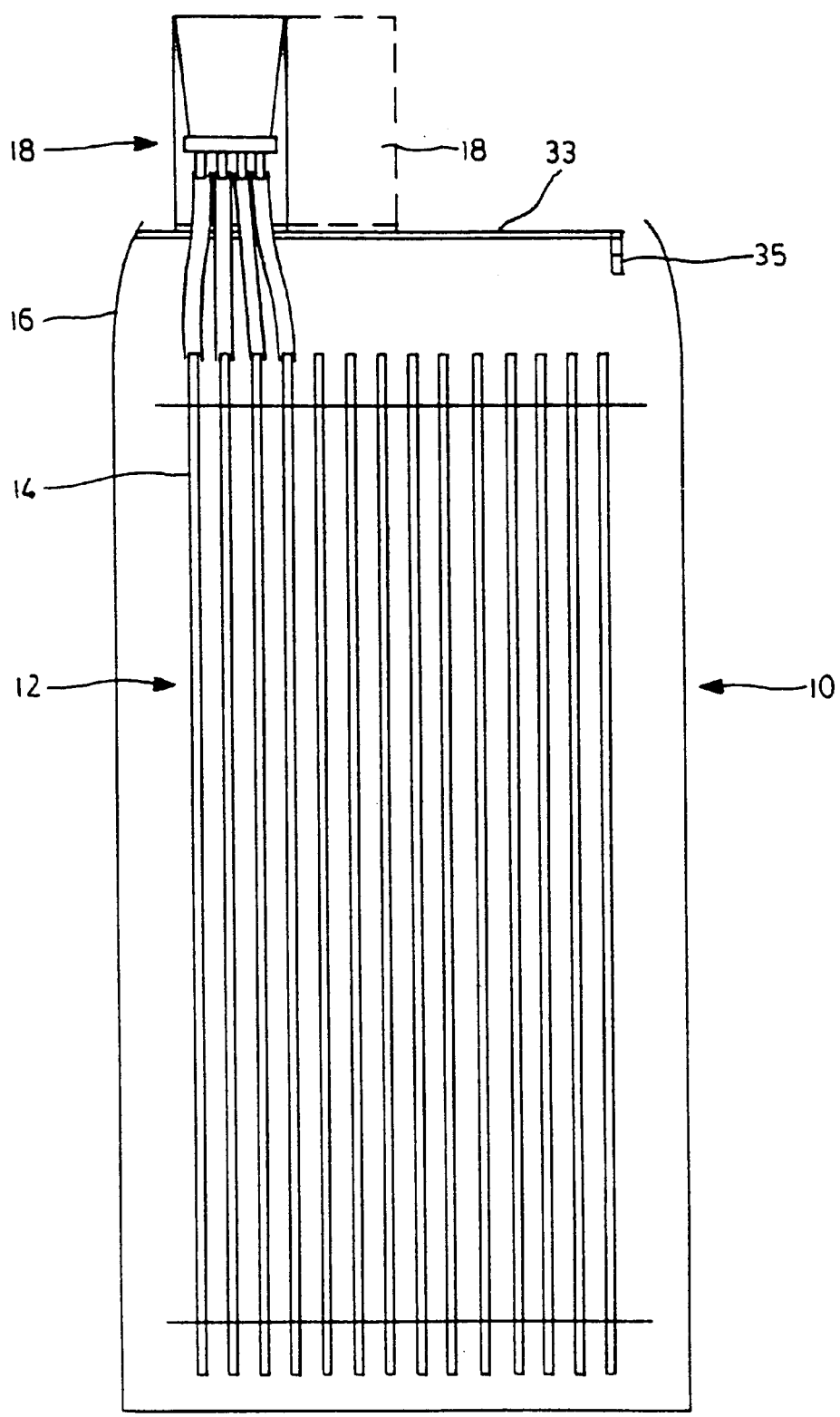
FIG. 1 is a schematic illustration of a reactor vessel undergoing replenishment.

The material in the tubes 14 requires replenishment on a periodic basis and to perform such replenishment access is provided through the domed top 16. Provision is made on each of the tubes 14 to remove the granular material from within tubes and a replenishment unit 18 utilized to refill the tubes 14 with new granular material. As shown in FIG. 1, each unit 18 may simultaneously replenish four of the tubes 14 although it will be understood that this is by way of example only and that each unit 18 may be configured to replenishment 2, 4, 8 or other sets of tubes simultaneously. In addition, as shown diagrammatically in FIG. 1 in ghosted outline, additional units 18 may be utilized to permit the servicing of multiples sets of tubes simultaneously.

Figure 2:
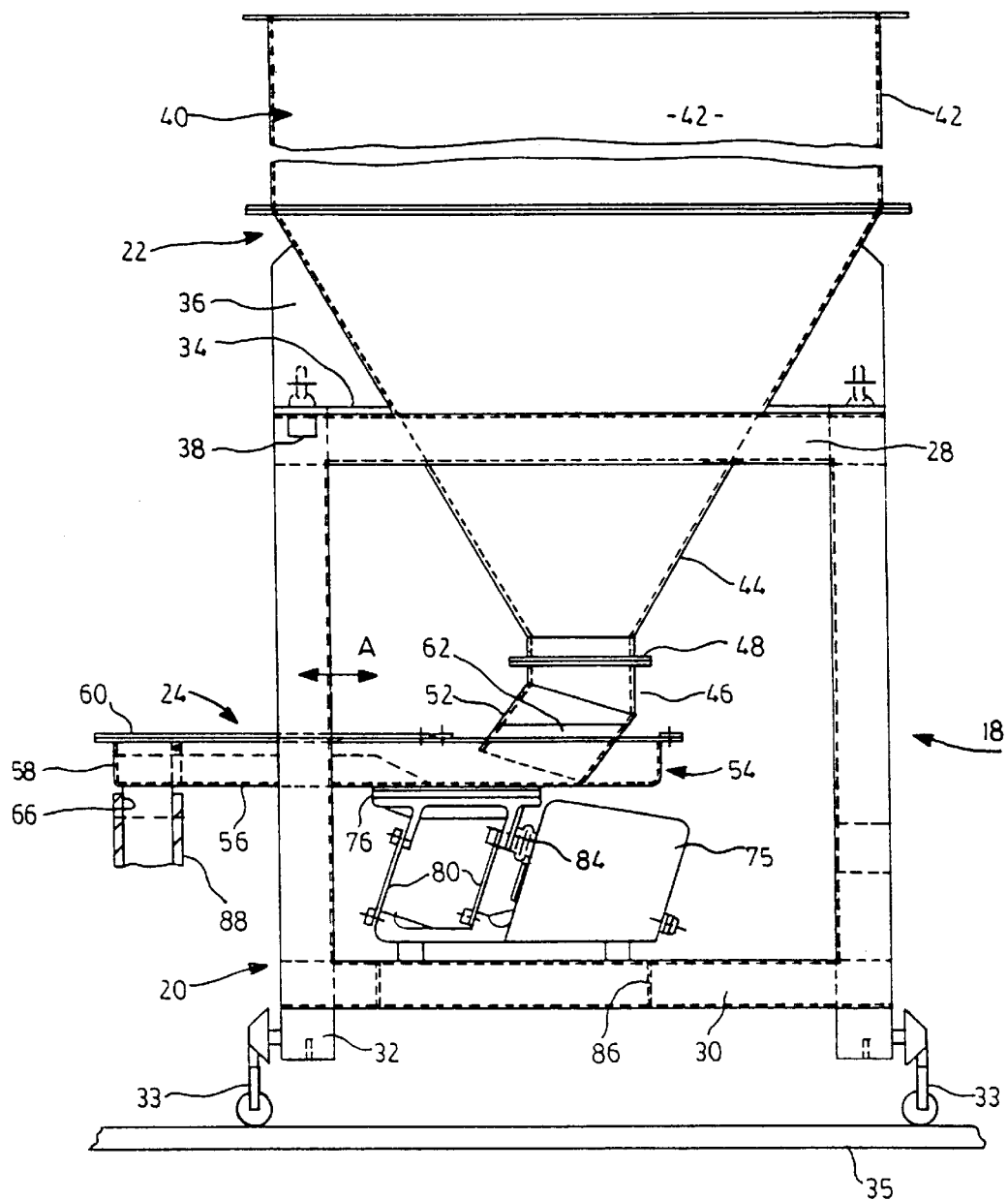
FIG. 2 is a side view of a unit used in the replenishment of the reactor vessel of FIG. 1.
Figure 3:
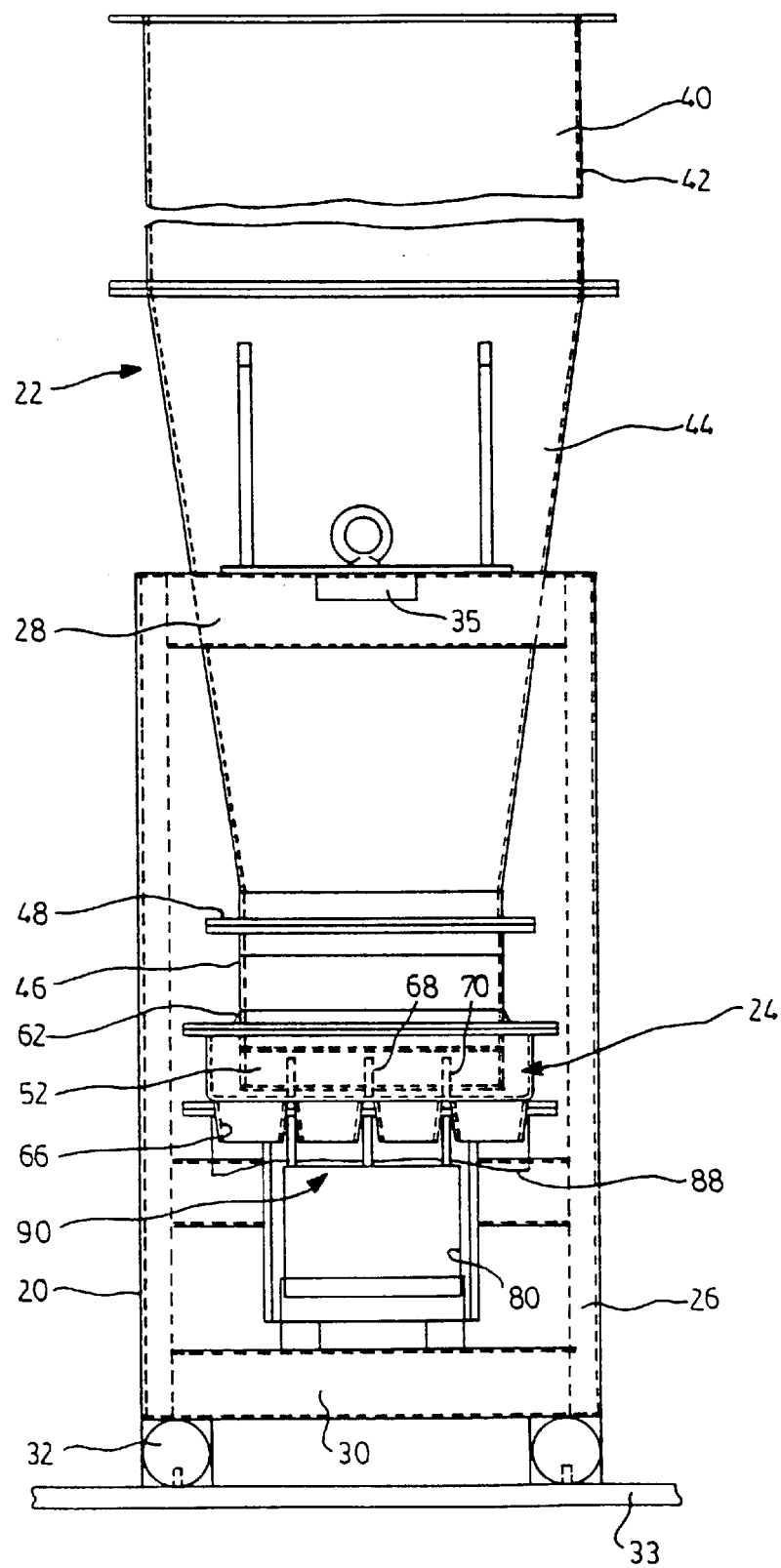
FIG. 3 is an end view of the unit of FIG. 2.
Figure 4:
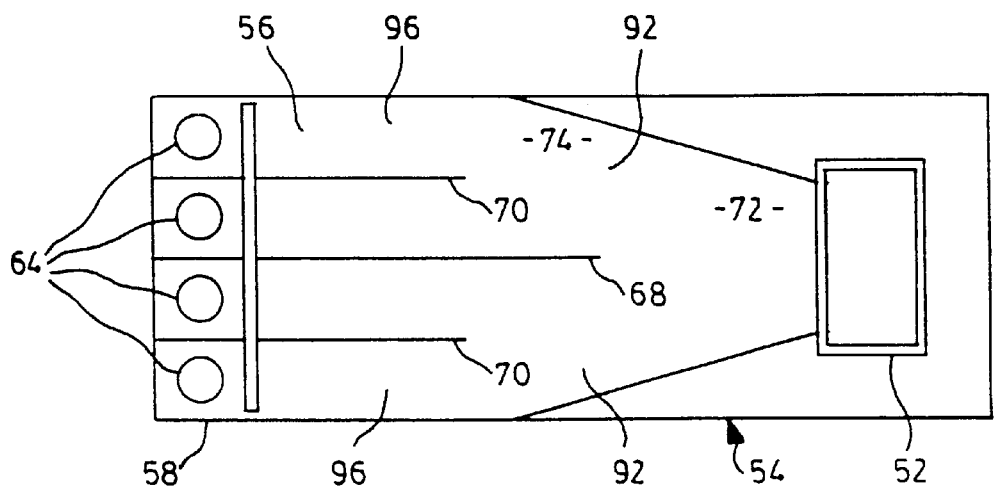
FIG. 4 is a pan view on the line 4—4 of FIG. 3.

The arrangement of the unit 18 is best seen from FIGS. 2 to 4. The unit 18 includes a dispenser 19 that has a frame 20 to support a hopper 22 and a conveyor 24. The frame 20 includes vertical legs 26 interconnected by upper rails 28 and lower rails 30 to provide a rigid rectangular frame. The frame 20 is supported on wheels that run on rails 33 extending across the dome 16. As shown in FIG. 1, the rails 33 are themselves supported on orthogonal rails 35 so that the unit 18 may be positioned along two mutually perpendicular axes to a desired location.

The hopper 22 is supported on the upper rails 28 by flanges 34 strengthened by gussets 36. A load cell 38 is placed between the flange 34 and upper rail 28 to provide a signal indicative of the mass of granular material within the hopper 22. The load cell 38 is of conventional construction and will not be described further at this time.

As can best be seen from FIGS. 2 and 3, the hopper 22 has an upper body 40 of generally rectangular cross section formed by planar air sidewalls 42. The upper body 40 is supported upon a tapered lower body 44 having planar air sidewalls 46. The sidewalls of the upper body 40 lie within the periphery of the frame 20 so that multiple units 18 may be positioned side by side as illustrated schematically in FIG. 1.

The lower body 44 terminates in an outlet duct 46 that is secured to the lower body 44 at a flange 48. The outlet duct 46 is cranked as indicated at 50 to provide a forwardly projecting nose 52.

The outlet duct 46 is positioned adjacent to but above a tray 54 forming part of the conveyor 24. The tray 54 has a base 56 and upstanding peripheral sidewalls 58. A cover 60 extends across the sidewalls and an elastomeric boot 62 extends about the nose 52 to the cover 60 and sidewalls 58 to seal the duct in the tray 54.

The tray 54 projects forwardly beyond the legs 26 and is formed with four outlets 64. Each of the outlets 64 is circular and has a depending nozzle 66 formed on the underside of the tray. As can best be seen in FIG. 4, adjacent outlets 64 are separated by dividing walls 68, 70 that act as a barrier between adjacent outlets. The central wall 68 extends from one end of the tray toward the nose 52 of the duct 46. The central wall 68 terminates prior to the duct to provide a zone between the duct and the wall indicated at 72. The zone 72 permits the material discharged from the duct to be uniformly distributed across the tray prior to impinging upon the central wall 68. Typically the spacing between the centre line of the outlet duct 46 and the central wall 68 should be greater than 2 inches measured in the direction of material flow.

Intermediate walls 70 also extend toward the nose 52 and terminate prior to the termination of the central wall 68. The longitudinal offset between the central wall 68 and intermediate wall is again in the order of 2 inches to provide a zone 74 that permits uniform distribution of the granular material. Where additional outlets 64 are provided, additional walls will also be provided each staggered relative to an adjacent wall in the direction of movement of material.

A gate 73 is provided adjacent the outlets 64 to ensure material dose not drop into the outlets when the tray is stationary. The gate 73 is pivoted at its upper edge to the side walls 58 with slots to accommodate the dividing walls 68, 70.

The tray 54 is supported on a bracket 76 secured to a drive unit 78 by a pair of leaf strings 80. The leaf strings 80 permit the tray to oscillate in a fore and aft direction as indicated by the arrow A in FIG. 2 but constrain lateral movement during such oscillation. The bracket 76 is connected to a drive member 84 on the drive unit 78 which is caused to reciprocate at the resonant frequency of the tray and the material carried by the tray. The drive unit 78 is available from Arbo Engineering Inc. of North York, Ontario and its operation described fully in PCT Application WO86/02058 the contents of which are incorporated herein by reference. The drive unit 78 is mounted on transverse braces 86 that extend between the lower rails 30.

Each of the outlets 64 is connected to a respective conduit 88 that is frictionally engaged with the nozzle 66 and collectively are identified as manifold 90. The conduits 88 extend to respective ones of the tubes 14 and are dimensioned to be snugly received on the tubes so that material dispensed from outlet 64 is transferred through the conduits 88 to the interior of the tubes 14.

In operation, oscillation of the tray 54 by the drive unit 78 causes material deposited from the outlet duct 46 to be distributed along the tray and moved towards the outlets 64. The provision of the zone 72 prior to the dividing wall 68 ensures that the wall 68 accurately divides the material into a pair of equal streams 92. The streams 92 are subdivided by the intermediate wall 70 to provide four equal streams 96. As such, material deposited on the tray 54 is moved along the conveyor and discharged in equal quantities through respective ones at the outlets 64. Each of the tubes 14 connected to respective ones of the outlets 64 and therefore receives an equal quantity of the granular material and a uniform fill is obtained. After one set of tubes 14 is filled, the conduits 88 are disconnected and another set of 4 tubes 14 filled. To achieve consistency between the filling of the sets of tubes 14, control of the dispensers 19 is of paramount importance.

The dispensers may be controlled gravimetrically (weight based) or volumetrically (time based) depending upon the particular requirements.

Figure 5:
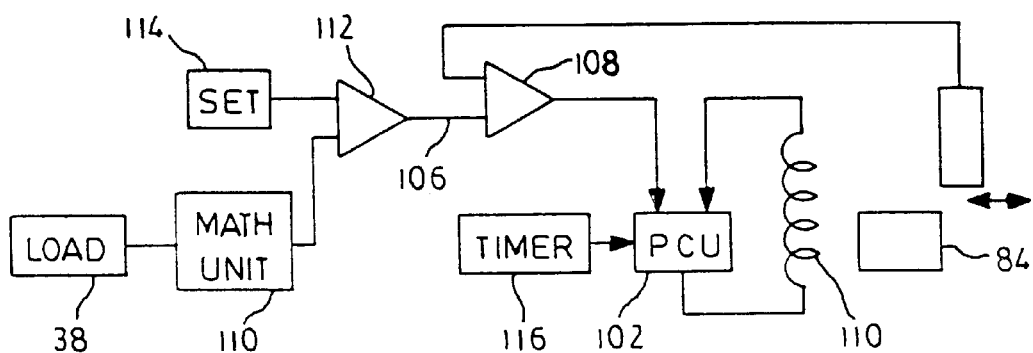
FIG. 5 is a schematic diagram of a control of the unit shown in FIGS. 2–4.

Control of the drive unit 78 is provided by the control function shown in FIG. 5.

The drive unit 78 includes a coil 100 which is supplied with a time varying voltage by a power control unit (PCU) 102. The PCU 102 monitors the current supplied to the coil 100 and adjusts the frequency at which it is supplied so that the current is a minimum. A minimum current indicates operation at a resonant frequency.

The oscillation of the tray 54 is monitored by a position transducer 104. The amplitude of oscillation is indicative of the flow rate along the tray 54 and the output of the transducer 104 is compared with a reference 106 at comparator 108. The error signal derived from comparator 108 is applied to the PCU 102 to adjust the voltage applied to the coil 100.

Reference signal 106 is determined by the controlling function, e.g. mass dispensed. The mass dispensed is derived from the load cell 38 through arithmetic unit dispensed mass 110 subtracting the present mass from the initial mass 110 and applied to comparator 112. A set signal 114 indicating the desired dispensed mass is applied to the comparator 112 and the reference signal 106 obtained. The arithmetic unit 110 monitors the mass flow rate to maintain it at a set rate indicated by set point 114.

For volumetric dispensing, a timer 116 controls operations of the PCU 102 and after a preset time the operation of the conveyor is terminated so that filling of the tubes 14 stops simultaneously. The close control of the amplitude of vibrations ensures that a consistent mass of material is delivered to each tube.

Other control strategies are available depending on the characteristics of the reactor.

The above example assumes that a single component is to be dispensed into each tube. However, where a mixture of components is to be dispensed, a pair of units 18 may be mounted side by side with each dispensing a different one of the components. The outlets are paired so that both components are dispensed into each tube. The dispensing rate from each unit may be adjusted to provide the required ratio of component mix on a continuous basis.

The embodiments of the invention in which an exclusive property or privilege is claimed are defined as follows:

1. A dispenser to dispense a granular material to a plurality of discrete locations including a hopper to contain the granular material, a discharge port to permit egress of material from said hopper, a conveyor to receive material from the discharge port and transfer it to said plurality of discrete locations, said conveyor comprising a tray having a plurality of outlets spaced from the discharge port and mutually spaced transverse to the direction of movement along said tray and each connectable to respective ones of the discrete locations, a barrier interposed between adjacent ones of the outlets to inhibit transfer of material therebetween, each of said barriers including a wall extending between said outlets and parallel to the direction of motion of said material on said conveyor and terminating at a location intermediate said outlet and said discharge port to permit uniform distribution of said material prior to separation by said walls and a vibratory drive to oscillate said tray and distribute said granular material uniformly on the tray, said drive inducing movement of said material from the discharge port to the outlets along the tray.

2. A dispenser according to claim 1 wherein said wall terminates at least 2 inches prior to said outlet.

3. A dispenser according to claim 2 wherein a plurality of walls are provided at spaced parallel to sections on said tray, said walls terminating at staggered locations along said tray.

4. A dispenser according to claim 3 wherein said staggered locations at which said adjacent ones and said walls terminate are spaced at least 2 inches from one another in the direction of movement of said material along said tray.

5. A dispenser according to claim 1 wherein said outlets are apertures formed in a base of said tray.

6. A dispenser according to claim 5 wherein a nozzle is formed around said outlets to receive a conduit for conveying material from said outlet to said tube.

7. A dispenser according to claim 1 wherein a scale is provided to determine the rate of change of mass of said material in said hopper and said vibratory drive is controlled to maintain the rate substantially constant.

8. A dispenser according to claim 7 wherein said scale includes a load cell positioned between said hopper and a supporting frame.

9. A method of replenishing a granular material in a chemical reactor having an array of tubes each of which is to contain a predetermined quantity of said material, said method comprising the steps of
   i) emptying said tubes of any of said material;
   ii) connecting a plurality of said tubes to respective ones of a plurality of outlets of a dispenser;
   iii) discharging said granular material from a hopper of said dispenser to a conveyor,
   iv) distributing said material uniformly on said conveyor,
   v) moving said material toward said outlets;
   vi) dividing said material into a plurality of equal streams as it moves towards said outlets;
   vii) discharging said streams through respective outlets simultaneously to commence filling of said plurality of said tubes; and
   viii) monitoring the contents of said tubes and terminating discharge of said material from each of said outlets simultaneously upon attainment of a predetermined fill condition
whereby said plurality of tubes are substantially uniformly filled with said granular material simultaneously.

10. A method according to claim 9 wherein said conveyor includes a tray driven by a vibratory drive and amplitude of oscillations of said tray is monitored and maintained at a predetermined level.

11. A method according to claim 10 wherein said contents are monitored by measuring the change of mass of material in said hopper.

12. A method according to claim 11 wherein the rate of change of mass of material is monitored and said conveyor adjusted to maintain said rate substantially consistent.

13. A method according to claim 12 wherein said conveyor includes an oscillatory tray driven by a vibratory drive and the amplitude of vibrations is adjusted to maintain said rate of change of mass substantially constant.

14. A reactor replenishing unit for replenishing granular material in tubes of a reactor vessel, said unit including a dispenser to dispense said granular material at a plurality of outlets and a manifold to convey said material from said outlets to respective ones of said tubes, said dispenser having a hopper to contain said granular material, a conveyor to receive said granular material from said hopper and transfer it to said outlets, said conveyor including a tray to receive material from said hopper and a plurality of barriers on said tray to divide said material between said hopper and said outlets into a plurality of streams, each of which is associated with respective ones of said outlets whereby each of said streams is conveyed to a respective one of said tubes by said manifold.

15. A refurbishing unit according to claim 14 wherein said manifold includes a plurality of conduits each of which is connected between a respective outlet and a respective one of said tubes.

16. A refurbishing unit according to claim 14 wherein and said outlets are apertures in said tray, each of said apertures having a nozzle to facilitate connection to said manifold and inhibit transfer of material between said outlets.

17. A refurbishing unit according to claim 14 wherein said hopper and conveyor are supported within a frame, said hopper having planar side panels within the lateral extent of said frame to permit stacking of frames in side by side relationship.

18. A refurbishing unit according to claim 17 wherein said conveyor projects forwardly from said frame to facilitate connection of said manifold.

19. A refurbishing unit according to claim 14 wherein said conveyor includes a vibratory drive to oscillate said tray and distribute said granular material uniformly thereon.

20. A refurbishing unit according to claim 19 wherein said vibratory drive is a resonant drive having a control to maintain said oscillations at a resonant frequency of said conveyor.

21. A refurbishing unit according to claim 20 wherein said control monitors flow of material to said outlets and adjusts said drive to maintain a predetermined parameter.

22. A refurbishing unit according to claim 21 wherein said control monitors the mass flow rate of material to said outlets and adjusts the amplitude of oscillation to maintain a predetermined mass flow rate.

23. A refurbishing unit according to claim 19 where a barrier is provided between adjacent pairs of outlets to divide material on said tray into a plurality of streams each associated with a respective outlet.

24. A refurbishing unit according to claim 23 wherein said barrier is a wall extending from said outlets toward said hopper.

25. A refurbishing unit according to claim 24 wherein said wall terminates intermediate said outlets and said hopper to permit uniform distribution of said material on said tray prior to division by said barrier.

* * * * *